Sept. 8, 1970   J. R. B. WALKDEN   3,527,484
APPARATUS FOR INCREASING THE PRESSURE RATING OF COUPLINGS
Filed March 17, 1969
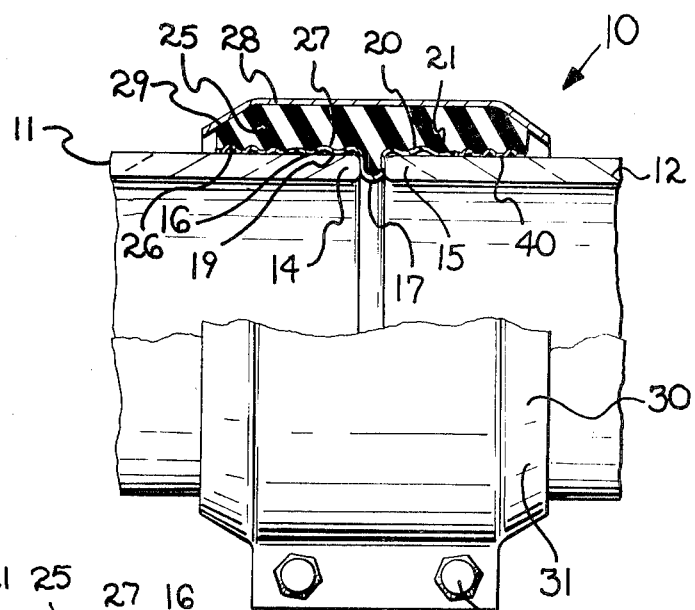
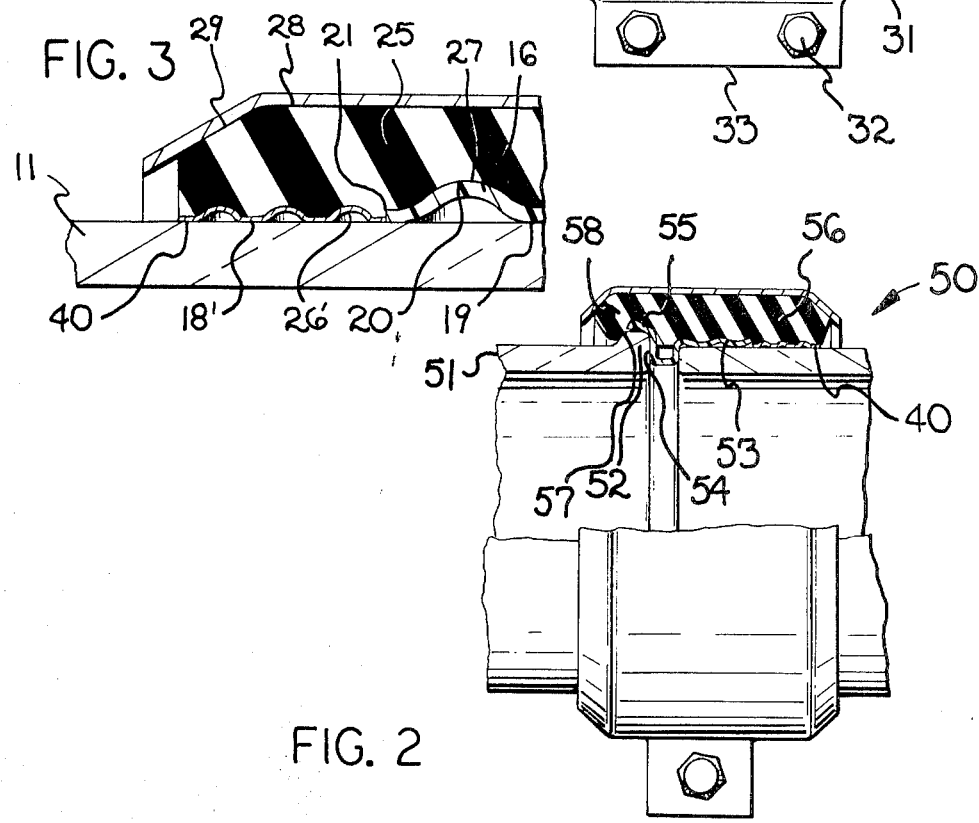
INVENTOR.
JOHN R.B. WALKDEN
BY D.R. Birchall
E.J. Holler
ATTORNEYS

United States Patent Office 3,527,484
Patented Sept. 8, 1970

3,527,484
APPARATUS FOR INCREASING THE PRESSURE RATING OF COUPLINGS
John R. B. Walkden, Vineland, N.J., assignor to Owens-Illinois, Inc., a corporation of Ohio
Filed Mar. 17, 1969, Ser. No. 807,722
Int. Cl. F16l *21/06*
U.S. Cl. 285—236
7 Claims

ABSTRACT OF THE DISCLOSURE

A pipe coupling for joining the plain ends of glass pipes comprising a deformable sealing gasket positioned between the abutting ends of said pipes, a post-cured elastomeric sleeve placed exteriorly around said sealing gasket and in contact with substantially the entire external surface of said sealing gasket, a coating of a high friction material placed between the pipe and the internal surface of the elastomeric sleeve extending beyond the ends of the sealing gasket and an external clamp ring positioned exteriorly of said elastomeric sleeve to tighten said clamp, thereby increasing the pressure rating of the coupling.

THE INVENTION

This invention relates to pipe couplings; more particularly, this invention relates to an apparatus for increasing the pressure rating of glass pipe couplings.

In the chemical industry where it becomes necessary to convey corrosive fluids that would normally erode away a similar pipe constructed of metal, glass pipes have been used extensively. While glass pipes provide an effective means of handling highly-reactive fluids, it is well known that the coupling together of such glass pipes, one to the other, is more complicated than the coupling together of similar all-metal pipes. The coupling must grasp the end of the pipe firmly enough to prevent leaks from occurring, yet not exceed the working stresses of the glass material which it surrounds. Also, the coupling must not scratch or mar the glass surface, since the resulting stress concentrations cannot be tolerated in structural glass materials.

The glass pipe couplings disclosed in the prior art for joining plain ends to beaded ends or plain ends to plain ends included a Teflon sealing gasket positioned over the exterior surfaces of the glass pipe, an elastomeric sleeve positioned exteriorly of the sealing gasket so that it contacts not only the sealing gasket, but also the exterior of the glass pipe, and a metallic constricting band placed radially outwardly from the elastomeric sleeve which is tightened to effect a seal.

One of the disadvantages of the prior art coupling was the fact that under constant pressure from within the glass pipe, the plain ends would slip out or blow out of the pipe coupling. It was found through extensive testing of a 2-inch bead to plain end coupling of the type above-described, that when the coupling was exposed to severe thermocycling conditions by raising and lowering the temperature of the coupling from 0° F. to 200° F. 15 times, the Buna n elastomer which was used as an elastic sleeve developed a permanent compression set. That is, under these conditions, after exposure to the high temperatures, the elastomer relaxed and was not able to contract to its original shape. The internal diameter of a coupling with a permanent compression set is greater than the diameter of a coupling as applied without the compression set. Thus, insufficient radial force was applied to the plain end pipe which resulted in failure by the plain end slipping out of the coupling at normal working pressures.

Two approaches were made to solve this problem.

The first involved attempts to reduce the heat compression set of the elastomer without reducing its chemical resistance. It was found that a post-curing operation on the elastomer by heating the elastomer for one hour at approximately 350° F. prior to its application into the coupling reduced the heat compression set and subsequent relaxation. The second approach involved attempts to increase the frictional characteristics of the glass to elastomer surface.

In the past, the pull out resistance of a metal to elastomer surface has been increased by the addition of such compounds as white lead or shellac to the interfaces of the metal and elastomer. Both of these compounds hardened, however, causing the coupling to adhere to the glass when it became necessary to remove the coupling. After extensive testing, it was found that by coating the interface between the glass and the elastomer with a commercial compound such as "Non Slip" No. RC–2–56 made by Robins Industries Corp. located in Flushing, N.Y., which compound is believed to be a homogeneous solution of rosin and ethyl alcohol, the pull out resistance was greatly increased and the rubber did not adhere to the glass upon release of the coupling. By using these two treatments, the post curing and the coating, an improved coupling was devised which permitted the use as a sleeve of the Buna n elastomer which not only has excellent chemical resistance, but also is very economical.

The present invention incorporates these two approaches and consists of two axially-aligned glass pipes with two of the ends thereof in abutting, but not contacting relationship. A Teflon, or similar material, sealing gasket is formed into a generally-cylindrical configuration and positioned over the exterior surfaces and between the ends of the glass pipes. A post-cured elastomeric sleeve is positioned exteriorly of the sealing gasket so that it not only contacts the sealing gasket, but also contacts the later-applied coating.

In the preferred embodiment of this invention, a coating of a high-friction material, one which increases the coefficient of friction of the surface coating, is painted on the interior of the post-cured elastomeric sleeve. One such material is a mixture of rosin and alcohol. As the ethanol base evaporates, the rosin adheres to the elastomer, thereby increasing its coefficient of friction. Later when the elastomer is clamped to the exterior of the glass pipe, the amount of force necessary to pull the pipe out of the coupling is much greater than that required for the same coupling without the coating. It is also conceivable that the high friction coating as described in this specification could be applied to the exterior surface of the glass pipe extending beyond the ends of the sealing gasket rather than to the elastomer. A metallic constricting band is then placed radially outward from the elastomeric sleeve and is tightened to effect a seal.

SUMMARY OF THE INVENTION

It is the purpose of this invention to provide a pipe coupling for uniting two axially aligned pipes. The coupling includes a deformable sealing gasket positioned between the abutting ends of the pipe, an elastomeric sleeve having a plurality of sealing rings therein placed around the sealing gasket, a coating of a friction material placed between the pipe and the coupling, and a ring clamp positioned around the sleeve to secure the coupling about the pipes.

The primary object of the present invention is to produce a pipe coupling that will provide an effective fluid seal while structurally uniting two lengths of glass pipe.

Another object of the present invention is to provide a method to increase the pressure rating of a glass coupling.

A further object of this invention is to provide a method to reduce the permanent compression set of a glass coupling.

An additional object of the present invention is to provide a coating between the glass and the elastomer to increase the frictional characteristics of the glass to elastomer interface without causing the elastomer to adhere to the glass.

An object of this invention is to provide a thin coating of a high friction material which has a thickness no greater than 0.010 inch.

Another object of the invention is to provide a material which increases the coefficient of friction of the glass to elastomer interface, and will not harmfully contaminate the fluid transported in the glass pipe.

An object of the invention is to provide a pipe coupling into which the ends of the pipe can be inserted without being obstructed by portions of the coupling.

The present invention consists of a sealing gasket of generally cylindrical configuration into which the ends of the pipe fit. An indented or centrally-located ring of lesser diameter than the external diameter of the glass pipe is incorporated as an integral part of the sealing gasket so that the ends of the glass pipe will abut thereagainst in sealing engagement. A coating of a non-hardening, friction-enhancing material is applied to the interface between the glass pipe and the later applied post-cured elastomeric sleeve. Additional sealing rings are positioned in concentric relationship on both sides of the minimum diameter portion of the sealing gasket for additional sealing against the exterior surfaces of the glass pipes. Positioned radially outward from the sealing gasket is an elastomeric compression sleeve that completely envelops the external surface of the sealing gasket. The elastomeric compression sleeve is retained by a clamp ring for compressing the elastomeric sleeve radially inward. As the clamp ring is compressed radially inward, it in turn forces the elastomeric sleeve into tight engagement with the friction-enhancing coating and the sealing gasket, which, in turn, are compressed into tight engagement with the external surface of the glass pipe.

IN THE DRAWINGS

FIG. 1 shows a side view of a pipe coupling partly broken away and shown in section.

FIG. 2 shows a side view of a pipe coupling partly in section which illustrates a variation in the pipe coupling.

FIG. 3 is an enlarged cross-sectional view through a portion of the sealing gasket, compression sleeve, coating and glass tubing.

Referring to FIG. 1 of the drawings, the overall pipe coupling is represented by the numeral 10. A glass pipe 11 and an axially aligned pipe 12 are shown with their respective plain ends 14 and 15 in spaced apart relationship. A coating 40 of a high friction solution such as ethanol and rosin is placed between the external surface of pipes 11 and 12 and the internal surface of later applied elastomeric sleeve 25 extending beyond the ends 21 of sealing gasket 16. This coating is carefully applied so that it does not contact the interior of sealing gasket 16, since that could produce a leak in the seal at the junction of ends 14 and 15 and eventually result in corrosion of the gasket. Although in the preferred embodiment of this invention the high friction coating is applied to the interior surface of elastomeric sleeve 25, it would be obvious to one skilled in this art that the coating could be applied to the exterior of the glass pipes 11 and 12 between the ends 21 of sealing gasket 16 and the ends of the coupling 10. Sealing gasket 16 is positioned over the exterior portion of ends 14 and 15 of glass pipes 11 and 12. Sealing gasket 16 is preferably made from a material such as Teflon which is chemically resistant to the chemicals to be transported in the pipes. Towards the center of sealing gasket 16 is a radially-inwardly extending ring 17. Ring 17 can be cylindrical across its inwardmost extent or it can be rounded. When viewed in the cross section of FIG. 1, that portion of sealing gasket 16 laying immediately adjacent the external surface of glass pipes 11 and 12 is of undulating or sinusoidal configuration. The peaks or radially outward section 20 of sealing gasket 16 are not necessarily in contact with the exterior surface of the glass pipes. The end 21 of sealing gasket 16 is located radially away from the exterior of the glass pipes, thus facilitating the entry of glass pipes 11 and 12 into the coupling.

Positioned exteriorly of sealing gasket 16 is a post-cured elastomeric compression sleeve 25. Sleeve 25 may be made from any relatively incompressible post-cured resilient material such as, for example, rubber. The radially inward surface of sleeve 25 has an overall cylindrical configuration; however, reference to FIG. 1 will show that arcuate cutouts 26 are concentrically aligned and separated one from the other at the interior ends of elastomeric sleeve 25 by the relatively flat ridges 18. Toward the central section of sleeve 25, the arcuate cutouts 26 stop and a series of rings 27 are formed across the central interior of the sleeve 25. The rings 27 are of a sinusoidal or similar configuration to the exterior of the sealing gasket. The exterior 28 of elastomeric sleeve 25 is of cylindrical configuration and contains beveled ends 29. When the entire configuration of sealing gasket 16 and elastomeric sleeve 25 is considered, it will be immediately apparent that the radially inward sections of sealing gasket 16 will contact the exterior of glass pipes 11 and 12 as at contact points 19, while the ridges of elastomeric sleeve 25 which are coated with coating 40 will contact the glass beyond the ends of sealing gasket 16.

A clamp ring 30 surrounds elastomeric sleeve 25 and also has radially inward sloping frusto-conical surfaces 31 on both sides thereof. Bolts 32, which pass through outstanding radial flanges 33, provide a constricting means and are located at the arcuate extents of clamp ring 30.

During installation, the sealing gasket 16 is positioned within elastomeric sleeve 25 so that its corrugated exterior surface coincides with the corrugated interior surface of sleeve 25. In this manner the exterior of sealing gasket 16 will be in contact with sleeve 25 at all its interior surfaces except at inwardly-extending ring 17. The interior of sleeve 25 extending beyond the ends of sealing gasket 16 will be in contact with the high friction coating 40 placed between the sleeve and the glass pipe. Clamp ring 30 is then positioned over the outside of the elastomeric sleeve 25 with bolts 32 in an untightened position. Glass pipes 11 and 12 with their plain ends 14 and 15 are inserted one at a time or simultaneously into the coupling so that ends 14 and 15 stop in engagement against radially inwardly extending ring 17. As ends 14 and 15 are progressing inwardly toward ring 17, they move easily past ends 21 of sealing gasket 16 because ends 21 are flared in an outward direction and, hence, do not catch against the ends of the glass pipes. When glass pipes 11 and 12 are seated against ring 17 of gasket 16, clamping ring 30 is restricted by tightening bolts 32. Frusto-conical surfaces 31 act against the beveled ends 29 of elastomeric sleeve 25, thus preventing, to any appreciable extent, extrusion or expansion of the sleeve material in an axial direction. The constricting force applied against elastomeric sleeve 25 by clamp ring 30 forces arcuate cutouts 26 radially inward so that the high friction coating placed on the sleeve 25 contacts the external surface of the glass pipes both at cutouts 26 and at ridges 18. In this manner, the glass pipe is prevented from being blown out or axially ejected from the pipe coupling because of the internal pressure from within the pipe system acting upon the exposed edges of the glass pipes. An effective seal is achieved between the sealing gasket 16 and the external surface of the glass pipe because the ringed surface of sleeve 25 is forced radially inward, thus causing the rings defined by 19 and 20 in the drawing to have a tendency to straighten out and go into compression under the influence of the constricting force as supplied by elastomeric sleeve 25. The undulations on the sealing gasket 16 will not entirely collapse under the radial constricting force of sleeve 25, therefore, the radially innermost surfaces of rings 19 will be firmly in contact with the glass surface of the pipes, thus preventing the passage of a fluid from within the pipe system and out through the pipe coupling. An effective seal is also achieved between the elastomeric sleeve 25 extending beyond the ends of sealing gasket 16 and the external surface of the glass pipe. As the ridged surface of compression sleeve 25 extending beyond the ends of sealing gasket 16 is forced radially inward, the arcuated cutouts defined by 26 and coated with coating 40 in the drawing will be pushed radially inward under the influence of the constricting force caused by the tightening of bolts 32 and transmitted through clamp ring 30. The resulting seal, including the exterior surface of the glass, the high friction coating 40 and the interior of the elastomeric sleeve 25 beyond the ends of sealing gasket 16 is shown in the enlarged section in FIG. 3. The radially concentric ridges 18' are under a compression force as are arcuate cutouts 26', and although the arcuate cutouts 26' are not fully collapsed under the constricting radial force of clamp ring 30, the resulting radial force supplied by the constricting clamp 30 along with the pull out force necessary to overcome the increased coefficient of friction at the glass-elastomer interface caused by the residual rosin coating 40, creates an improved pipe joint which can withstand a higher internal pressure than a corresponding pipe joint without the high friction coating. Thus, the coupling with the coating and the post-cured elastomer sleeve has a higher pressure rating than a corresponding coupling without the coating where the elastomer sleeve has not been subjected to a post-curing operation.

FIG. 2 shows a pipe coupling, partly in section, that is somewhat similar to the coupling depicted in FIG. 1 and heretofore described in detail. FIG. 2, however, shows a coupling adapted to accommodate a glass pipe with a plain end and an axially aligned glass pipe with a flanged end. The overall coupling is represented by numeral 50. That end of coupling 50 which surrounds the glass pipe with the plain end is, for all practical purposes, identical to one-half of coupling 10, therefore, the foregoing description of its details need not be repeated herein.

Glass pipe 51 contains an outwardly-flanged or bulbous end 52 that has a greater radial extent than does the exterior of pipe 51. Sealing gasket 53 which can be made of Teflon or similar material abuts end 52 of glass pipe 51 outwardly extending at flange 54. Flange 54 of gasket 53 is coupled to the small end of a frusto-conical extension 55 of gasket 53. As can be seen in FIG. 2, the radially outermost free edge of frusto-conical extension 55 terminates radially outward and beyond the outer periphery of flanged end 52 of the pipe 51. It is to be considered within the scope of the present invention if frusto-conical section 55 were to be curved instead of frusto-conical as shown in the drawings. Elastomeric sleeve 56 contains an internal groove 57 into which the extending part 55 of gasket 53 registers. The end 58 of sleeve 56 adjacent flanged end 52 of glass pipe 51 forms an inwardly-projecting ring of material that is axially aligned behind flange 52 of pipe 51.

When a constricting force is applied by the exteriorly-placed compression band, the combination of gasket 53, sleeve 56 and coating 40 will sealingly grasp the plain ended glass pipe as heretofore described. The inward force applied by sleeve 56 will cause the frusto-conical extension 55 of gasket 53 to bend or wrap around the exterior of flanged end 52 of glass pipe 51. At the same time, end 58 of sleeve 56 will be moved into contacting engagement behind flanged end 52, thus preventing glass pipe 51 from moving axially out of the confinement of the pipe coupling 50 when an internal pressure is applied within the pipe system.

The foregoing description sets forth the details of a simplified glass pipe attachment means that couples ease of installation with a positive leak-proof joint which is an improvement over similar pipe attachments. It is conceivable that the pipe coupling as described within this specification could be used with pipes other than glass.

While certain representative embodiments and details have been shown for the purpose of illustrating the invention, it will be apparent to those skilled in this art that various changes and modifications may be made therein without departing from the spirit and scope of the invention.

What is claimed is:

1. In combination, two glass pipe sections to be coupled and a pipe coupling for uniting said pipes in axial alignment, said pipe coupling including:
    (a) a deformable sealing gasket position between the abutting ends of said pipes and extending in an axial direction around and partially in contact with a portion of the exterior surface of said pipes, adjacent the ends thereof, the ends of said sealing gasket spaced radially outward from the exterior surfaces of said pipes when said coupling is in the assembled but untightened condition,
    (b) an elastomeric sleeve with a plurality of radially inwardly protruding sealing rings over a portion of the interior thereof placed exteriorly around said sealing gasket and in contact with substantially the entire external surface of said sealing gasket, said elastomeric sleeve continuing axially beyond the ends of said sealing gasket and containing at least one radially inwardly protruding ring on each end thereof beyond the ends of said sealing gasket that will encircle said pipes when said coupling is in a tightened condition,
    (c) a coating of a nonadhesive friction material placed between the external surface of the pipes and the coupling, said coating having a thickness of no more than 0.010 inch, thereby increasing the pull-out resistance of the pipes from the surrounding coupling,
    (d) an external clamp ring positioned exteriorly of said elastomeric sleeve and having an axial extent at least as far as said sleeve, said clamp ring equipped with constricting means and containing a radially inwardly extending edge portion that restricts axial expansion of said sleeve when said ring is tightened.

2. In combination, two glass pipe sections to be coupled and a pipe coupling for uniting said pipes in axial alignment, said pipe coupling including:
    (a) a deformable sealing gasket positioned between the abutting ends of said pipes and extending in an axial direction around and partially in contact with a portion of the exterior surface of said pipes, adjacent the ends thereof, the ends of said sealing gasket spaced radially outward from the exterior surfaces of said pipes when said coupling is in the assembled but untightened condition,
    (b) a post-cured elastomeric sleeve with a plurality of radially protruding sealing rings over a portion thereof placed exteriorly around said sealing gasket and in contact with substantially the entire external surface of said sealing gasket, said elastomeric sleeve continuing axially beyond the ends of said sealing gasket and containing at least one radially inwardly protruding ring on each end thereof beyond the ends of said sealing gasket that will encircle said pipes when said coupling is in a tightened condition,
    (c) a coating of a nonadhesive friction material consisting of a volatile vehicle and a rosin base between the external surface of said pipes and the internal surface of the elastomeric sleeve and between the ends of said sealing gasket and the ends of said coupling, thereby increasing the pull-out resistance of the pipes from the surrounding coupling,
    (d) an external clamp ring positioned exteriorly of said elastomeric sleeve and having an axial extent at least as far as said sleeve, said clamp ring equipped with constricting means and containing a radially-inwardly extending edge portion that restricts axial expansion of said sleeve when said clamp ring is tightened.

3. The combination of a pipe coupling as claimed in claim 2 wherein said post-cured elastomeric sleeve comprises a preshrunk rubber heat-cured at a temperature of at least 350° F. for at least one hour.

4. The combination of a pipe coupling as claimed in claim 2 wherein said post-cured elastomeric sleeve contains a plurality of axially spaced circumferentially extending grooves in the interior surface of said sleeve, said grooves positioned between the ends of said sleeve and the axially terminal point of said sealing gasket.

5. The combination as claimed in claim 2 wherein the coating material comprises rosin, thereby increasing the pull out resistance of the pipe from the coupling.

6. The combination of a pipe coupling as claimed in claim 2, wherein the coating material comprises a homogeneous abrasive solution of ethanol and rosin, thereby increasing the pull-out resistance of the pipe from the coupling.

7. The combination as claimed in claim 2 wherein the thickness of the coating is less than 0.010 inch.

References Cited

UNITED STATES PATENTS

| | | | |
|---|---|---|---|
| 3,235,293 | 2/1966 | Condon | 285—233 |
| 3,252,192 | 5/1966 | Smith. | |
| 3,325,195 | 6/1967 | Margis | 285—328 X |
| 3,376,055 | 4/1968 | Donne | 285—236 |
| 3,394,952 | 7/1968 | Garrett | 285—236 |
| 3,439,945 | 4/1969 | Chambers et al. | 285—373 |

DAVE W. AROLA, Primary Examiner

U.S. Cl. X.R.

285—328, 373 423